2,320,827

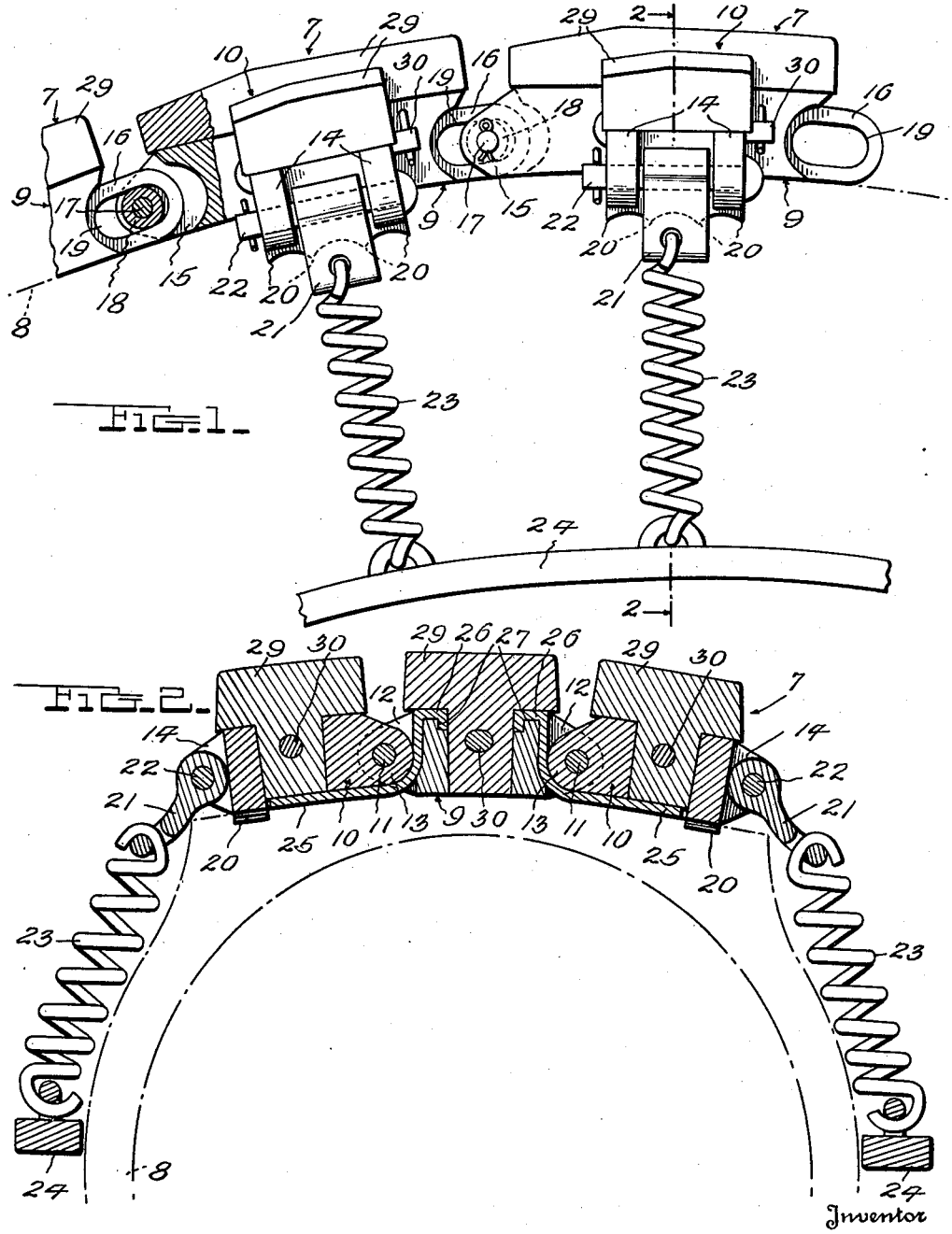

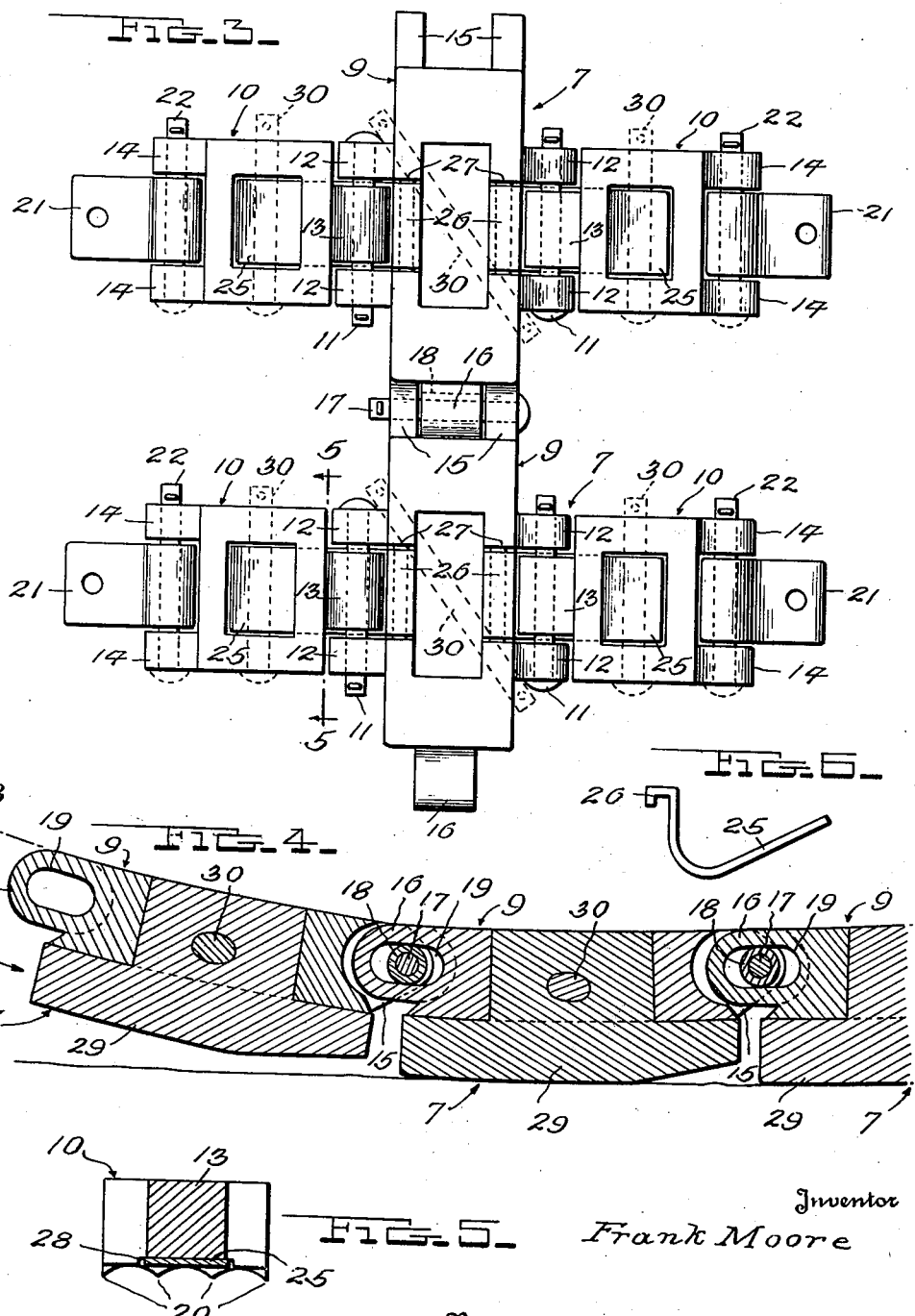
June 1, 1943.    F. MOORE    2,320,827
TIRE ARMOR
Filed Oct. 2, 1942    2 Sheets-Sheet 2
Inventor
Frank Moore Patented June 1, 1943

UNITED STATES PATENT OFFICE 2,320,827

TIRE ARMOR

Frank Moore, Los Angeles, Calif.

Application October 2, 1942, Serial No. 460,557

4 Claims. (Cl. 152—184)

The invention aims to provide a novel and effective tire armor designed primarily for extending the useful life of worn automobile tires, although useable also to equal advantage to protect relatively unworn tires against wear.

A tread belt is provided to circumferentially surround a tire, said belt consisting of separate pivotally connected tread units effectively held against creeping on the tire; and a further object is to connect said tread units that without creeping on the tire, they may move bodily toward and from each other during compressive and tensional circumferential yielding of the tire, during use.

Each of the tread units comprises a central tread member and two lateral tread members hinged to said central member on axes disposed circumferentially of the tire, and means for securing said tread units in place are connected with the outer ends of said lateral tread members; and another object is to provide novel spring means associated with the hinges of said lateral tread members for insuring that the central tread members shall be held against the tire tread equally as forcibly as the lateral tread members which are directly held against the tread by the securing means.

A still further object is to provide an armor which may be easily and rather inexpensively manufactured and sold at a fair price, yet will be efficient and durable.

With the foregoing in view, the invention resides in the novel subject matter hereinafter described and claimed, description being accomplished by reference to the accompanying drawings.

Figure 1 is a fragmentary side elevation partly broken away and in section.

Fig. 2 is a transverse sectional view on line 2—2 of Fig. 1.

Fig. 3 is a plan view showing two of the tread units with their wear shoes removed, the pins for holding these shoes in place being shown in dotted lines.

Fig. 4 is a fragmentary sectional view cut longitudinally through a number of the central tread members.

Fig. 5 is a detail section on line 5—5 of Fig. 3.

Fig. 6 is an edge view of one of the springs which are associated with the hinges of the lateral tread members, showing the shape of the spring before it is tensioned, as in Fig. 2, by application of the armor to the tire.

A construction has been illustrated which has proven to be of advantage, and while this construction will be specifically described, it is to be understood that variations may be made within the scope of the invention as claimed.

An appropriate number of tread units 7 are provided to form a belt around the tire 8, each of said tread units comprising a central tread member 9 and two lateral tread members 10 which are hinged at 11 to said central tread member on axes extending circumferentially of the tire. Each hinge 11 is preferably of the knuckle-and-pin type disclosed, with two of the knuckles 12 on the central tread member 9 and a knuckle 13 on the lateral member 10. The outer end of each tread member 10 is also provided with two knuckles 14; one end of each central tread member 9 has two knuckles 15; and the other end of each member 9 is formed with another knuckle 16. The knuckle 16 of any tread member 9 is received between the knuckles 15 of the next adjacent tread member, and a pivot pin 17 passes through these inter-engaged knuckles, said pivot pin having a roller 18 between the knuckles 15. This roller is received in a slot 19 in the knuckle 16 so that the latter constitutes a guide extending in a circumferential direction and so receiving the roller 18 as to permit movement of the various tread units 7 toward and from each other as the tire yields circumferentially, both compressively and tensionally, during use, said movement of the tread units 7 toward and from each other occurring due to this yielding of the rubber even though said units are held against creeping upon the tire tread. To prevent this creeping, in the present disclosure, the outer end of each of the lateral tread members 10 is provided with squat teeth 20 which anti-slippingly engage the tire tread by deforming without actually cutting this tread. By locating the teeth 20 at the outer ends of the lateral tread members 10, they will engage the thicker portions of a worn tire tread, along the margins of said tread, as will be clear from Fig. 2, where the tread is stronger than at its badly worn central portion.

Links 21 are connected with the knuckles 14 of the lateral tread members 10, by suitable pivot pins 22, and radial tension springs 23 are connected with said links for disposition at the sides of the tire, the inner ends of these springs being connected to continuous rings 24.

Associated with the hinges 11 and with the tread members 9 and 10 connected by said hinges, are springs 25 which are so tensioned that they have a tendency to swing said tread members 10 outwardly away from the tire tread. Thus, before application of the armor to the tire, each tread unit 7 will have a concavo-convex transverse form with its convex side disposed inwardly. When the armor is applied to the tire, however, and the springs 23 hooked in place, these springs greatly overcome the tendency of said springs 25 to outwardly swing the tread members 10, the armor being thus drawn into tight engagement with the tire tread, with said springs 25 insuring that the central tread members 9 shall be held as tightly against the tread, as the lateral tread members 10 to which the securing means 23, etc., are directly connected.

It is preferable that each spring 25 be of substantially L-shape with a hook 26 at one end. This hook of each spring engages a suitable seat 27 in the outer side of the central tread member 9, and the other end of the spring extends along the tread-engaging side of the lateral tread member 10, the latter being grooved at 28 (Fig. 5) to receive the springs. Before application of the armor to the tire, the spring 25 assumes about the shape shown in Fig. 6, it being drawn, however, to the shape of Fig. 2 by the strength of the springs 23, which springs 23 also hold the anti-creeping teeth 20 engaged with the tire tread.

It is preferable that each one of the tread members 9 and 10 be equipped with a detachable wear shoe 29 held normally in place by a suitable pin 30, permitting substitution of new tread shoes whenever required by wear. The shoes 29 abut and hold the hooks 26.

From the foregoing, taken in connection with the accompanying drawings, it will be seen that novel and advantageous provision has been made for carrying out the objects of the invention, and attention is again invited to the possibility of making variations within the scope of the invention as claimed.

I claim:

1. A tire armor comprising a central tread member to lie against the central portion of a tire tread, two lateral tread members to lie against the marginal portions of the tire tread, hinges connecting said lateral tread members with said central tread member, the axes of said hinges being disposed circumferentially of the tire, spring means associated with said hinges and exerting outward force on said lateral tread members tending to swing them outwardly from the tire tread, and securing means connected to the outer ends of said lateral tread members and exerting an inward pull thereon overcoming said tendency of said spring means to swing said lateral tread members outwardly from the tire tread, whereby all of said tread members are held solidly against the tire tread.

2. A structure as specified in claim 1; together with squat teeth on the inner sides of said lateral tread members and located at the outer ends of these members to engage the marginal portions of the tire tread and prevent all of said tread members from creeping.

3. A structure as specified in claim 1; said spring means comprising L-shaped springs secured at one end to said central tread member and having their other ends disposed against the tread-engaging sides of said lateral tread members, said springs having integral hooks at said one end engaged with portions of said central tread member to secure said springs to said central tread member.

4. A structure as specified in claim 1; said spring means comprising L-shaped springs secured at one end to said central tread member and having their other ends disposed against the tread-engaging sides of said lateral tread members, said springs having integral hooks at said one end engaged with portions of said central tread member to secure said springs to said central tread member, and wear shoes secured to said tread members, the shoe of said central tread member abutting said hook and holding it engaged with said central tread member.

FRANK MOORE.